(12) United States Patent
Zhang et al.

(10) Patent No.: US 9,215,228 B1
(45) Date of Patent: Dec. 15, 2015

(54) AUTHENTICATION OF DEVICES HAVING UNEQUAL CAPABILITIES

(71) Applicant: Cisco Technology, Inc., San Jose, CA (US)

(72) Inventors: Tao Zhang, Fort Lee, NJ (US); Helder Antunes, Morgan Hill, CA (US); Aaron Lung, San Jose, CA (US); Chintan Patel, Kirkland, WA (US); Ajith Thrivikramannair, Milpitas, CA (US); Akshay Singhal, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/306,440

(22) Filed: Jun. 17, 2014

(51) Int. Cl.
  *H04L 9/00* (2006.01)
  *H04L 29/06* (2006.01)
  *H04L 9/08* (2006.01)

(52) U.S. Cl.
  CPC .............. *H04L 63/08* (2013.01); *H04L 9/0819* (2013.01); *H04L 9/0861* (2013.01)

(58) Field of Classification Search
  CPC ........ H04W 4/046; G06F 3/017; G06F 3/167; G06F 9/542; G06F 21/45; H04L 43/0811; H04L 43/0876; H04L 12/266; H04L 63/08; H04L 63/107
  See application file for complete search history.

(56) References Cited

U.S. PATENT DOCUMENTS

| | | | |
|---|---|---|---|
| 6,985,089 B2 | 1/2006 | Liu et al. | |
| 7,055,027 B1 * | 5/2006 | Gunter et al. | 713/151 |
| 8,452,969 B2 | 5/2013 | Iyer et al. | |
| 8,514,825 B1 | 8/2013 | Addepalli et al. | |
| 8,559,537 B2 | 10/2013 | Fernandez et al. | |
| 2005/0245272 A1 * | 11/2005 | Spaur et al. | 455/456.3 |
| 2006/0098588 A1 * | 5/2006 | Zhang et al. | 370/255 |
| 2007/0005197 A1 | 1/2007 | Ito et al. | |
| 2010/0037057 A1 * | 2/2010 | Shim et al. | 713/171 |
| 2011/0128902 A1 | 6/2011 | Guo | |

OTHER PUBLICATIONS

Kartik Krishnan, "Symmetric Key cryptosystem", SFWR 4CO3: Computer Networks and Computer Security, Mar. 2004, pp. 22-24-1-22-24-19.

Ayushi, "A Symmetric Key Crypographic Algorithm", International Journal of Computer Applications, vol. 1, No. 15, 2010, pp. 1-4.

* cited by examiner

Primary Examiner — Amir Mehrmanesh

(57) ABSTRACT

A system authenticates in-vehicle electronic devices having unequal capabilities such as having varying different communication and processing capabilities. A Connected Vehicle Gateway portion of a selected in-vehicle device acts as an onboard authentication proxy and onboard key server functionality for other in-vehicle devices, and serves as an interface between an in-vehicle network and one or more associated external networks, thereby eliminating the need for explicit peer discovery protocol and the requirement of devices to perform key establishment with each individual communication peer. Instead, each in-vehicle device establishes the group keys as a result of its authentication with the onboard key server and uses the group keys to locally generate and update its session keys. The onboard key server selectively obtains the keys from one or more off-board authentication servers and distributes them to selected in-vehicle devices.

12 Claims, 11 Drawing Sheets

AUTHENTICATION OF DEVICES HAVING UNEQUAL CAPABILITIES

TECHNICAL FIELD

The present disclosure relates generally to authentication of devices having unequal capabilities such as for example in-vehicle, industrial floor, home automation, and any other networked electronic devices having varying different communication and processing capabilities.

BACKGROUND

Modern vehicles such as cars, trucks, planes and trains typically use tens to over a hundred networked electronic devices ranging from simple sensors generating various feedback signal messages to more complicated Electronic Control Units (ECUs) consisting of microcontrollers and microcomputers for control of vehicle systems and operations, to support communication between the vehicle and systems external to the vehicle, and to provide applications to users. The originally installed devices on a vehicle are authenticated or assumed to be authentic during the device or vehicle manufacturing process. Accordingly, no provisions are made for further device authentication to be performed after the vehicle leaves the vehicle manufacturing plant. Consequently, without an authorization protocol in place, unauthorized devices can be easily installed into the in-vehicle network or used to replace existing devices on a vehicle. Unauthorized aftermarket devices can also be attached to the in-vehicle network to provide user services and communicate with other in-vehicle devices. Similar problems exist in industrial floor, home automation, and other networked device systems.

In-vehicle device authentication systems that support widely diverse in-vehicle devices over heterogeneous networks are unavailable. For example, since Controller Area Network (CAN) buses do not provide device authentication mechanisms, application-layer authentication mechanisms such as the seed-key method have been used to control access to ECU firmware from external diagnostic tools for ECU firmware updates. These application-layer authentication mechanisms, however, cannot support authentication of all types of in-vehicle networks, especially devices that only send but not receive data (e.g., sensors) and devices that are incapable of performing sophisticated cryptographic operations. Various authentication tools for in-vehicle Ethernet networks are limited to supporting device authentication at the Ethernet MAC layer. Therefore, the application layer and network-specific authentication protocols are unable to provide for authentication of in-vehicle electronic devices having varying different communication and processing capabilities.

BRIEF DESCRIPTION OF THE DRAWINGS

The accompanying drawings incorporated herein and forming a part of the specification illustrate the example embodiments.

FIG. 4 is a control flow diagram illustrating a sample procedure for authenticating a device ("Type-B" device) selected from the first set of in-vehicle network devices having capabilities as shown in FIG. 2a.

DESCRIPTION OF EXAMPLE EMBODIMENTS

Overview

Figure 1:
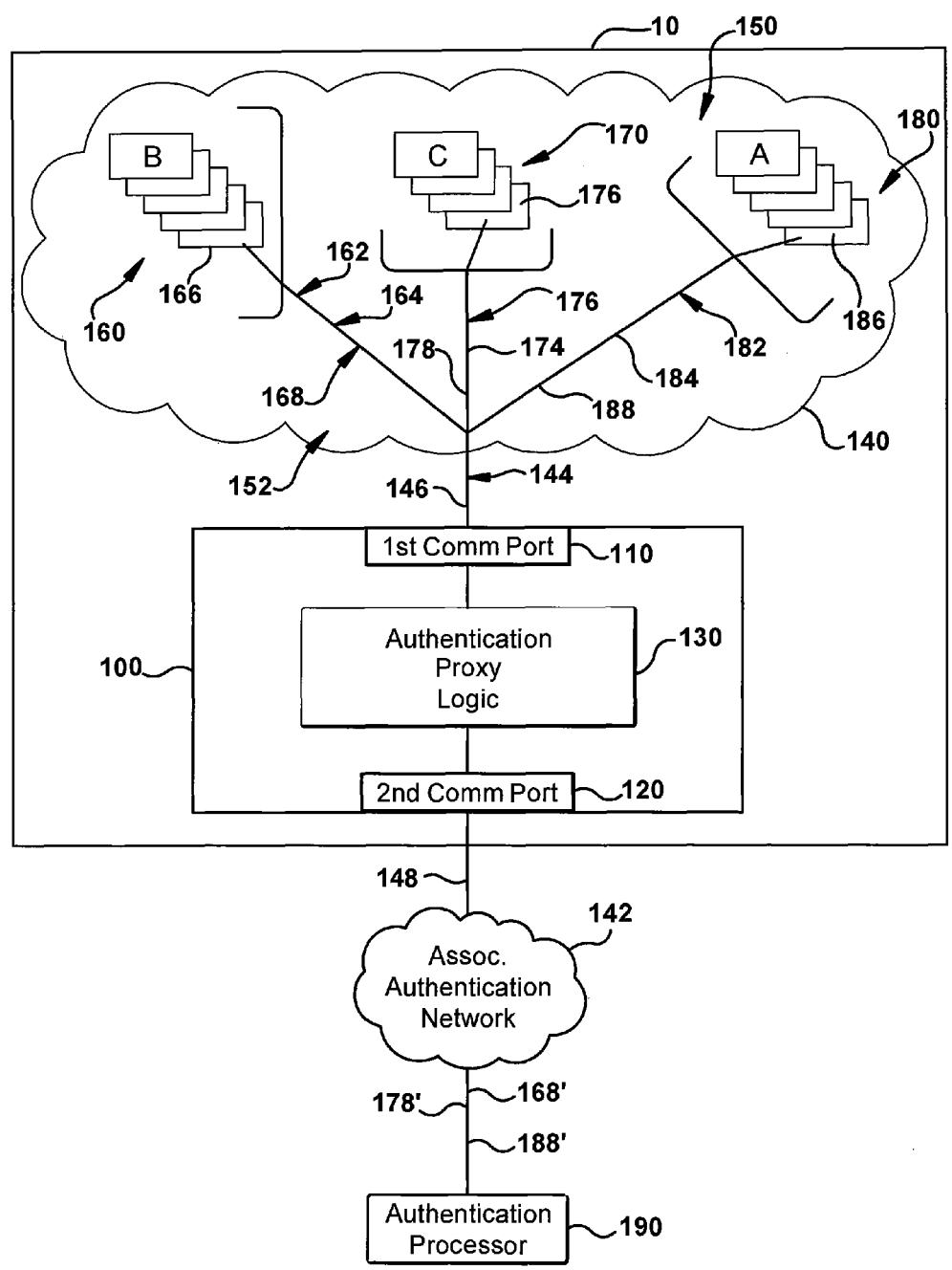
FIG. 1 is a simplified block diagram illustrating a system for authenticating devices having unequal capabilities such as in-vehicle electronic devices having varying different communication and processing capabilities.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

Overall, in accordance with example embodiments herein, apparatus, methods and logic encoded in one or more tangible non-transient computer readable media for execution by a processor and when executed by the processor, the logic, the apparatus, and the methods are operable to locally authenticate in-vehicle devices that have different and potentially vastly different computing and communication capabilities, thereby supporting network inclusion of devices with diverse capabilities such as devices that can only send but not receive data, devices that can perform only symmetric-key cryptographic operations but not public-key algorithms, devices that do not support Internet Protocols (IP), and devices that support sophisticated security algorithms and IP-based security protocols. The embodiments herein allow in-vehicle devices to use different individualized authentication methods that match their own particular capabilities and, further, the embodiments herein also support devices attached to different types of in-vehicle networks (e.g., CAN, LIN, MOST, and Ethernet).

In accordance with example embodiments herein, apparatus, methods and logic encoded in one or more tangible non-transient computer readable media for execution by a processor and when executed by the processor, the logic, the apparatus, and the methods are operable to authenticate a plurality of associated in-vehicle network devices having unequal communication and processing capabilities. First and second signals are received by a first communication port configured to communicate via an associated communication network with first and second sets of associated in-vehicle network devices having first and second authentication capabilities respectively. The first signal includes first authentication request data representative of a request for authentication from at least one of the first set of network devices having the first authentication capability. The second signal includes second authentication request data representative of a request for authentication from at least one of the second set of network devices having the second authentication capability. An authentication proxy processor selectively authenticates the at least one of the first set of network devices based on the first authentication request data in accordance with the first authentication capability, and selectively authenticates the at least one of the second set of network devices based on the second authentication request data in accordance with the second authentication capability.

In accordance with further example embodiments herein, apparatus, methods and logic encoded in one or more tangible non-transient computer readable media for execution by a processor and when executed by the processor, the logic, the apparatus, and the methods are operable to selectively generate by the authentication proxy logic a first cryptographic key set responsive to the authentication proxy logic authenticating the at least one of the first set of network devices based on the first authentication request data in accordance with the first authentication capability. The authentication proxy logic selectively distributes the first cryptographic key set to the first set of network devices.

In accordance with still further example embodiments herein, apparatus, methods and logic encoded in one or more tangible non-transient computer readable media for execution by a processor and when executed by the processor, the logic, the apparatus, and the methods are operable to selectively generate by the authentication proxy logic a second cryptographic key set responsive to the authentication proxy logic authenticating the at least one of the second set of network devices based on the second authentication request data in accordance with the second authentication capability. The authentication proxy logic selectively distributes the second cryptographic key set to the first set of network devices.

In accordance with still further example embodiments herein, apparatus, methods and logic encoded in one or more tangible non-transient computer readable media for execution by a processor and when executed by the processor, the logic, the apparatus, and the methods are operable to intercept by the authentication proxy logic unidirectional message data transmitted by the at least one of the second set of network devices into the associated communication network, wherein the intercepted unidirectional message comprises the second authentication request data representative of the request for authentication from the at least one of the second set of network devices.

In accordance with still further example embodiments herein, responsive to the authentication proxy logic failing to locally authenticate the at least one of the first set of network devices based on the first authentication request data in accordance with the first authentication capability, the first authentication request data is selectively forwarded by a second communication port configured to communicate via an associated authentication network to an associated authentication processor. The associated authentication processor selectively authenticates the first authentication request data. A first cryptographic key set is selectively received by the authentication proxy logic via the second communication port from the associated authentication network responsive to the associated authentication processor authenticating the at least one of the first set of network devices based on the first authentication request data, and the authentication proxy logic selectively distributes the first cryptographic key set to the first set of network devices.

Yet still further in accordance with example embodiments herein, responsive to the authentication proxy logic failing to locally authenticate the at least one of the second set of network devices based on the second authentication request data in accordance with the second authentication capability, the second authentication request data is selectively forwarded by a second communication port configured to communicate via the associated authentication network to the associated authentication processor. The associated authentication processor selectively authenticates the second authentication request data. A second cryptographic key set is selectively received by the authentication proxy logic via the second communication port from the associated authentication network responsive to the associated authentication processor authenticating the at least one of the second set of network devices based on the second authentication request data, and the authentication proxy logic selectively distributes the second cryptographic key set to the first set of network devices.

DETAILED DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

With reference now to the drawing Figures, wherein the showings are for purposes of illustrating example embodiments only and not for purposes of limiting same, FIG. 1 illustrates an apparatus 100 disposed in an associated vehicle 10 for authenticating a plurality of associated network devices 150 having unequal communication capabilities. The apparatus 100 includes, in the example embodiment, a first communication port 110 configured to communicate via an associated communication network 140 with the plurality of associated network devices 150, a second communication port 120 configured to communicate via an associated authentication network 142 with an associated authentication processor 190, and authentication proxy logic 130 operatively coupled with the first and second communication ports 110, 120. "Logic" and/or "module" as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSoC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In accordance with the embodiments herein, the apparatus 100 is configured to locally authenticate in-vehicle devices 152 having vastly different computing and communication capabilities, including devices that can only send but not receive messages such as simple sensors or the like, devices that are capable of performing only symmetric-key cryptographic operations and not public-key algorithms, devices that do not support IP protocols, and devices that support sophisticated security algorithms and IP-based security protocols. In addition, the apparatus 100 is configured to locally authenticate in-vehicle devices using different authentication methods that match the respective capabilities of the various devices 152. Yet still further, the apparatus 100 is configured to locally authenticate the in-vehicle devices 152 which may be attached to different types of networks (e.g., CAN, LIN, MOST, and Ethernet) comprising the associated communication network 140. In accordance with the example embodiment, the in-vehicle devices 152 are classified to allow devices with different capabilities to use different authentication procedures based on their communication and cryptographic processing capabilities, as illustrated in FIG. 1.

A first set ("Type B" devices) of associated network devices 160 in the example embodiment has a first authentication capability wherein the in-vehicle electronic devices of the first set 160 have bidirectional communication capability and are capable of supporting only symmetric-key cryptography. The apparatus 100 is in operative communication with the first set of devices 160 via the first communication port 110 using the associated communication network 140. Similarly, a second set ("Type C" devices) of associated network devices 170 in the example embodiment has a second authentication capability wherein the in-vehicle electronic devices of the second set 170 can send but not receive messages, and are capable of supporting only symmetric-key cryptography. The apparatus 100 is in operative communication with the second set of devices 170 via the first communication port 110 using the associated communication network 140. The devices of the second set (Type C) of associated network devices 170 are, in the example embodiment, simple sensor devices or the like, capable of only transmitting encrypted messages representative of a measure of the parameter being sensed, for example. Lastly in the example embodiment, a third set ("Type A" devices) of associated network devices 180 in the example embodiment has a third authentication capability wherein the in-vehicle electronic devices of the third set 180 have bidirectional communication capability and are capable of supporting both public-key and symmetric-key cryptography. The apparatus 100 is in operative communication with the third set of devices 180 via the first communication port 110 using the associated communication network 140.

Overall, the first communication port 110 receives signals 144 comprising authentication request data 146 representative of requests for authentication from one or more of the network devices 152. The authentication proxy logic 130 selectively authenticates the network devices 152 based on the authentication request data in accordance with the authentication capability of the associated requesting device. The authentication proxy logic adapts is authentication response in accordance with the particular communication and processing capabilities of the authentication-requesting device. For some devices such as the second set (Type C) of associated network devices 170 capable of only transmitting encrypted messages representative of a measure of the parameter being sensed, for example, the authentication proxy logic intercepts the messages and interprets them as authentication requests is the device is not already authenticated. The authentication proxy logic selectively generates a cryptographic key set responsive to the authentication proxy logic authenticating the network devices based on the authentication request data in accordance with the particular authentication capability of the requesting device. Thereafter, the authentication proxy logic selectively distributes the cryptographic key set to selected one or more of the network devices.

In addition to the above, in general in the example embodiment, the authentication proxy logic 130 selectively forwards the authentication request data 146 to the associated authentication processor 190 by the second communication port 120 via the associated authentication network 142 responsive to the authentication proxy logic 130 failing to locally authenticate the authentication-requesting associated network device. The authentication proxy logic 130 selectively receives a first cryptographic key set 148 by the second communication port 120 via the associated authentication network 142 responsive to the associated authentication processor 190 authenticating the authentication-requesting associated network device. Thereafter, the authentication proxy logic 130 selectively distributes the first cryptographic key set 148 to the appropriate one or more associated in-vehicle network devices 150.

In a particular example embodiment and with continued reference to FIG. 1, the first communication port 110 receives a first signal 162 comprising first authentication request data 164 representative of a request for authentication from at least one 166 of the first set of network devices 160 having the first authentication capability, and receives a second signal 172 comprising second authentication request data 174 representative of a request for authentication from at least one 176 of the second set of network devices 170 having the second authentication capability different than the first authentication capability. The authentication proxy logic 130 selectively authenticates the at least one 166 of the first set of network devices 160 based on the first authentication request data 164 in accordance with the first authentication capability, and selectively authenticates the at least one 176 of the second set of network devices 170 based on the second authentication request data 174 in accordance with the second authentication capability different than the first authentication capability.

The authentication proxy logic 130 selectively generates the first cryptographic key set 168 responsive to the authentication proxy logic 130 authenticating the at least one 166 of the first set of network devices 160 based on the first authentication request data 164 in accordance with the first authentication capability, and selectively generates a second cryptographic key set 178 responsive to the authentication proxy logic 130 authenticating the at least one 176 of the second set of network devices 170 based on the second authentication request data 174 in accordance with the second authentication capability.

In the example embodiment, since the second set of network devices 170 are capable of only sending but not receiving messages, but are capable of supporting symmetric-key cryptography, the authentication proxy logic 130 of the example embodiment selectively distributes the first cryptographic key set 168 to the first set of network devices 160, and selectively also distributes the second cryptographic key set 178 to the first set of network devices 160. The authentication proxy logic 130 of the example embodiment also selectively distributes the first and second cryptographic key sets 168, 178 to the third set of network devices 180 as may be necessary or desired for the third set of network devices 180 to communicate with the first and second sets of network devices 160, 170.

In addition to the above, in the example embodiment, the authentication proxy logic 130 selectively forwards the first authentication request data 164 to the associated authentication processor 190 by the second communication port 120 via the associated authentication network 142 responsive to the authentication proxy logic 130 failing to locally authenticate the at least one 166 of the first set of network devices 160 based on the first authentication request data 164 in accordance with the first authentication capability. The authentication proxy logic 130 selectively receives a first cryptographic key set 168' by the second communication port 120 via the associated authentication network 142 responsive to the associated authentication processor 190 authenticating the at least one 166 of the first set of network devices 160 based on the first authentication request data 164. Thereafter, the authentication proxy logic 130 selectively distributes the received first cryptographic key 168' set to the first set of network devices 160.

Still further in addition to the above, in the example embodiment, the authentication proxy logic 130 selectively forwards the second authentication request data 174 to the associated authentication processor 190 by the second communication port 120 via the associated authentication network 142 responsive to the authentication proxy logic 130 failing to locally authenticate the at least one 176 of the second set of network devices 170 based on the second authentication request data 174 in accordance with the second authentication capability. The authentication proxy logic 130 selectively receives a second cryptographic key set 178' by the second communication port 120 via the associated authentication network 142 responsive to the associated authentication processor 190 authenticating the at least one 176 of the second set of network devices 170 based on the second authentication request data 174. Thereafter, the authentication proxy logic 130 selectively distributes the second cryptographic key set 178' to the first set of network devices 160. The second cryptographic key set 178' is not distributed to the second set of network devices 170 because, as noted above, in the example embodiment, the second set of network devices 170 are capable of only sending but not receiving messages. In the example embodiment, the authentication proxy logic 130 may also selectively distribute the second cryptographic key set 178' to the third set of network devices 180 as may be necessary or desired for the third set of network devices 180 to communicate with the first and second sets of network devices 160, 170.

Figure 2A:
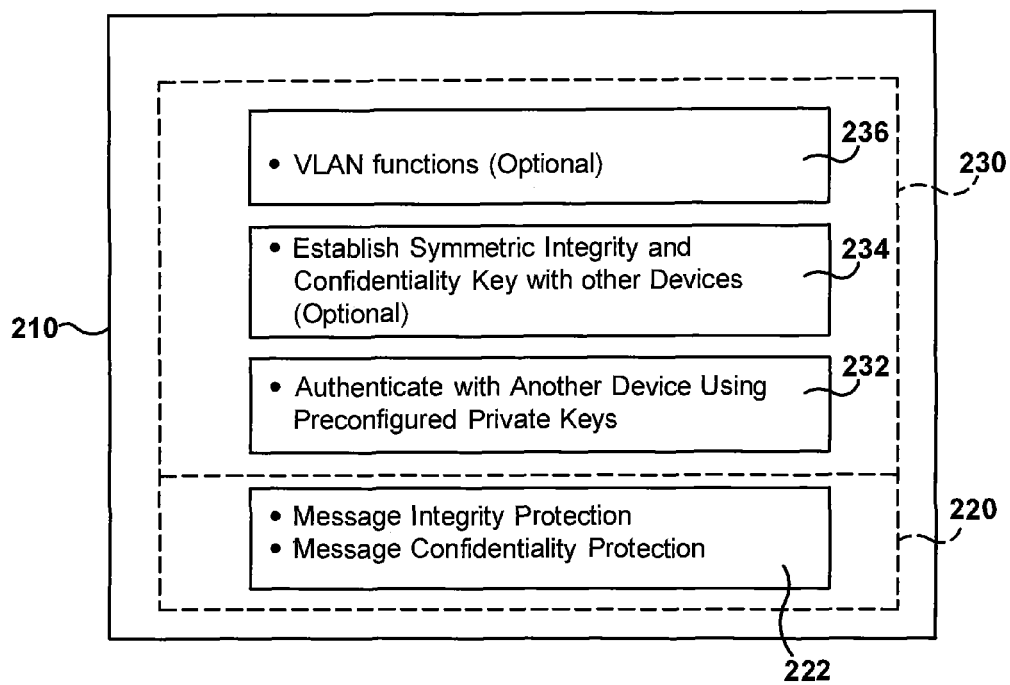
FIG. 2a is an illustration of a capabilities block showing communication and processing capabilities of a first set of the in-vehicle devices of FIG. 1.

As noted above, the first set (Type B) of associated network devices 160 in the example embodiment has an overall first authentication capability wherein the in-vehicle electronic devices of the first set 160 have bidirectional communication capability and are capable of supporting only symmetric-key cryptography. FIG. 2a shows a capability block 210 of the first set 160 of devices defining capabilities of the first set 160 of devices such as processing and communication capabilities for example. The capabilities block 210 of the first set 160 of devices includes a first tier set 220 of processing and communication capabilities, and a second tier set 230 of processing and communication capabilities. In the example embodiment the first tier set 220 of processing and communication capabilities includes Message Integrity and Confidentiality Protection processing and communication capabilities 222. Also in the example embodiment the second tier set 230 of capabilities includes processing and communication capabilities for Authenticating with Other Devices Using Preconfigured Private Keys 232, processing and communication capabilities for Establishing Symmetric Integrity and Confidentiality Keys With Other Devices 234, and processing and communication capabilities for performing Virtual Local Area Network (VLAN) Functions 236.

Figure 2B:
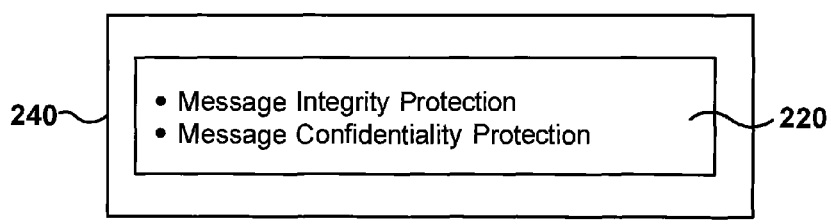
FIG. 2b is an illustration of a capabilities block showing communication and processing capabilities of a second set of the in-vehicle devices of FIG. 1.

Similarly, the second set (Type C) of associated network devices 170 in the example embodiment has an overall second authentication capability wherein the in-vehicle electronic devices of the second set 170 can send but not receive messages, and are capable of supporting only symmetric-key cryptography. The second set (Type C) of associated network devices 170 are, in the example embodiment, simple sensor devices or the like, capable of only transmitting encrypted messages representative of a measure of the parameter being sensed such as vehicle speed, acceleration or altitude, for example. FIG. 2b shows a capabilities block 240 of the second set 170 of devices defining capabilities of the second set 170 of devices such as processing and communication capabilities for example. The capabilities block 240 of the second set 170 of devices includes the first tier set 220 of processing and communication capabilities of the first set 160 of devices. In the example embodiment the first tier set 220 of processing and communication capabilities includes Message Integrity and Confidentiality Protection processing and communication capabilities 222. Although the first tier set 220 of processing and communication capabilities are the same as between the first and second sets of network devices 160, 170 in the example embodiment, they may be different in other embodiments.

Figure 2C:
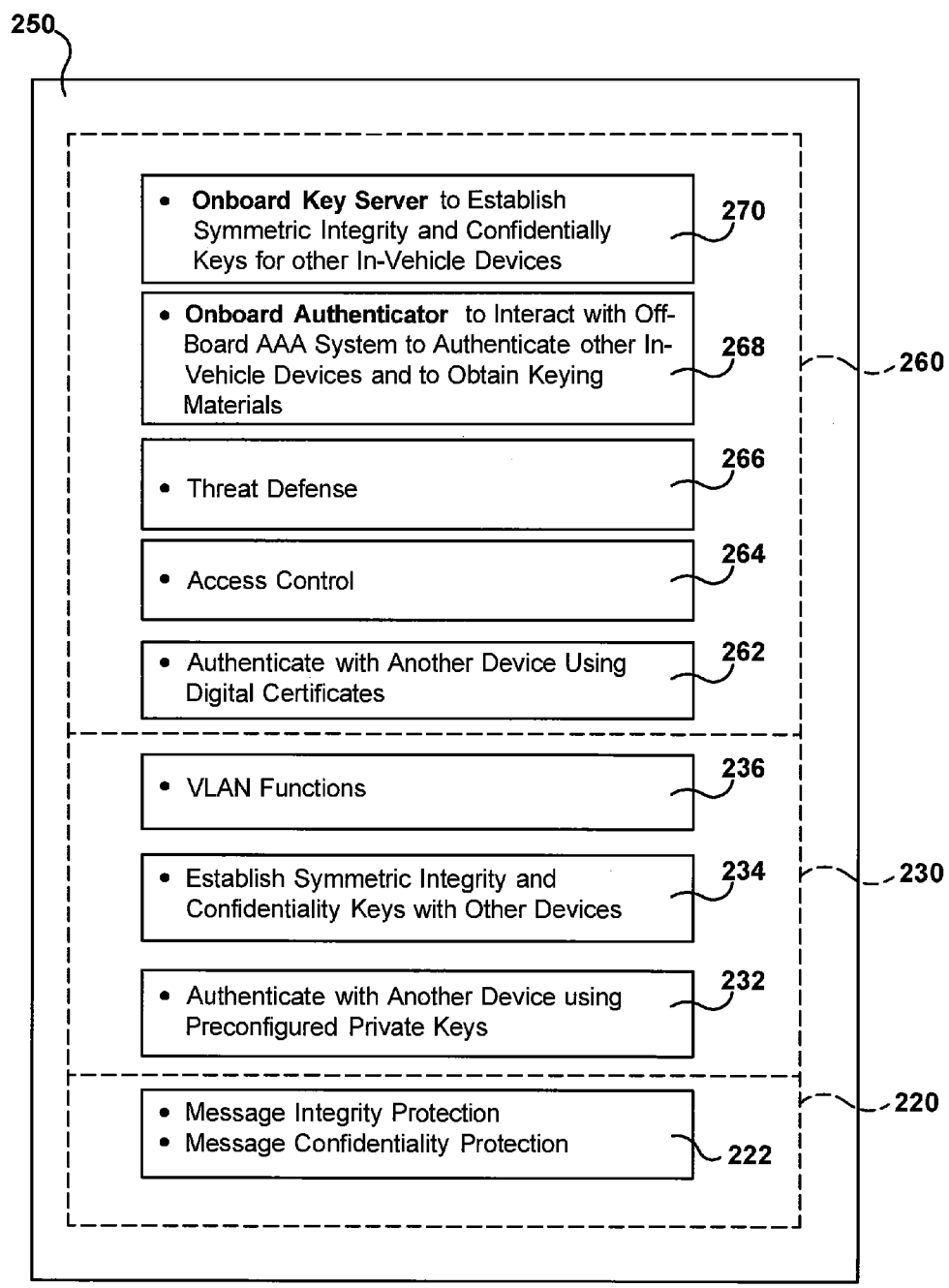
FIG. 2c is an illustration of a capabilities block showing communication and processing capabilities of a third set of the in-vehicle devices of FIG. 1.

Lastly in the example embodiment, the third set (Type A) of associated network devices 180 in the example embodiment has an overall third authentication capability wherein the in-vehicle electronic devices of the third set 180 have bidirectional communication capability and are capable of supporting both public-key and symmetric-key cryptography. As shown in FIG. 2c, a capabilities block 250 of the third set 180 of devices defines capabilities of the third set 180 of devices such as processing and communication capabilities for example. The capabilities block 250 of the third set 170 of devices includes the first tier set 220 of processing and communication capabilities of the first and second sets 160, 170 of devices, the second tier set 230 of processing and communication capabilities of the second set 170 of devices unavailable to the second set 170 of devices, and a third tier set 260 of processing and communication capabilities unavailable to the first and second sets 160, 170 of devices. In the example embodiment the third tier set 260 of processing and communication capabilities includes Authentication Using Digital Certificates processing and communication capabilities 262, Access Control processing and communication capabilities 264, Threat Defense processing and communication capabilities 266, Onboard Authentication processing and communication capabilities 268, and Onboard Key Server processing and communication capabilities 270. Although the first and second tier sets 220, 230 of processing and communication capabilities are the same as between the second and third sets of network devices 170, 180 in the example embodiment; they may be different in other embodiments.

Figure 3:
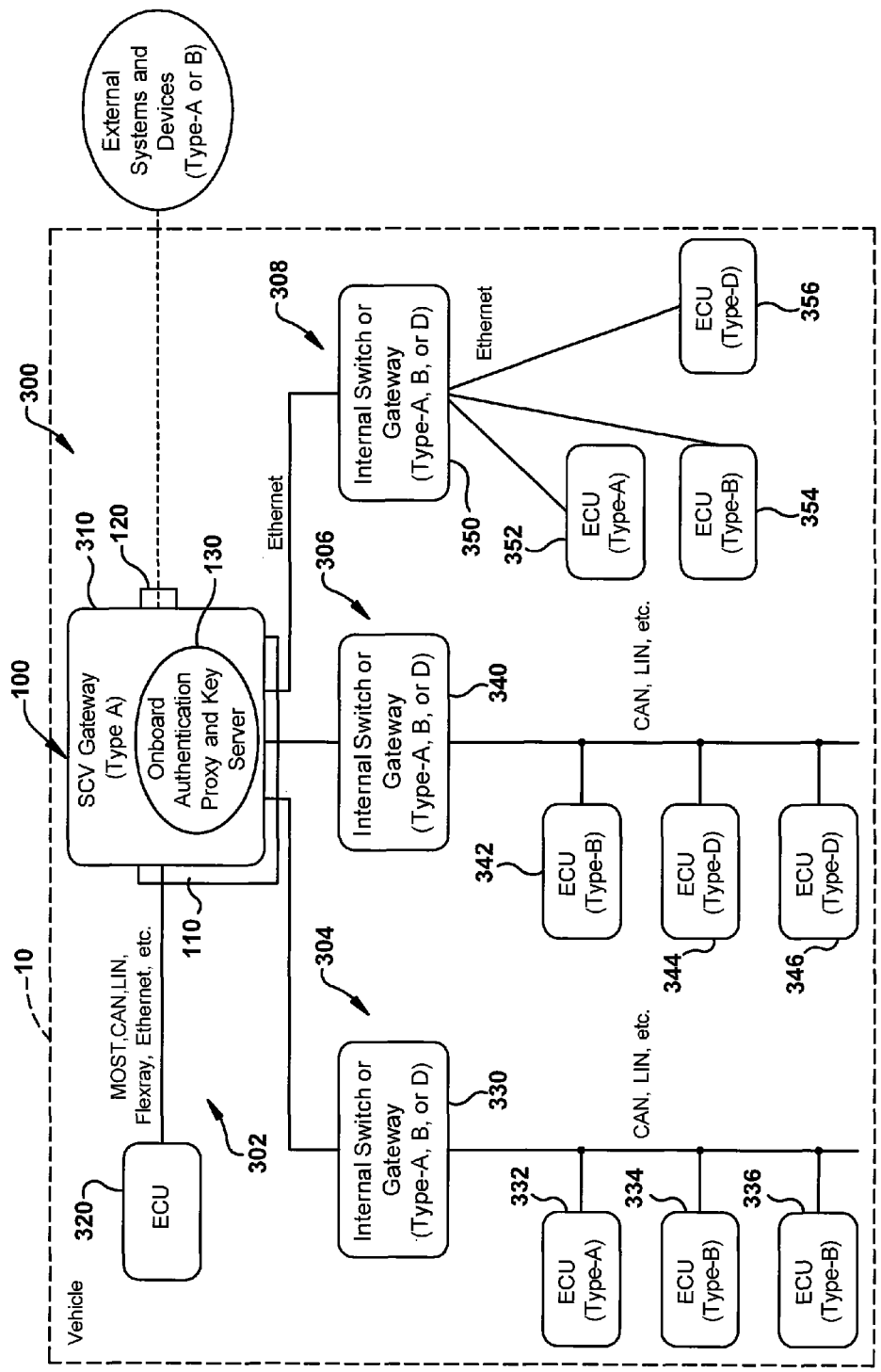
FIG. 3 is a schematic diagram illustrating a simplified configuration of a network having several sub-networks within an associated vehicle.

FIG. 3 is a schematic diagram illustrating a simplified configuration of a network 300 having several sub-networks 302, 304, 306, and 308 within a vehicle 10 wherein a selected one 310 of the third set of network devices 180 is functionally operable in the capacity of the apparatus 100 (FIG. 1) for authenticating a plurality of associated network devices having unequal communication capabilities described above in connection with FIG. 1. The illustrated embodiment demonstrates an example showing a manner in which different electronic devices within an associated vehicle 10 can be implemented as different types of in-vehicle network devices for providing authentication of the in-vehicle electronic devices having the different communication and processing capabilities. In particular, in the example shown, a selected one 310 of the third set of network devices 180 is functionally operable in the capacity of the network gateway apparatus 100 described above in connection with FIG. 1 as a Connected Vehicle Gateway for authenticating the plurality of associated network devices having the unequal communication capabilities. In the example embodiment illustrated, the first sub-network 302 includes an Electronic Control Unit (ECU) 320 of the associated vehicle 10 wherein the ECU 320 is in operative communication with the Connected Vehicle Gateway network device 310 and wherein the network device 310 is a member of the third set of network devices 180. The second, third and fourth sub-networks 304, 306, and 308 are operatively coupled with the Connected Vehicle Gateway network device 310 and each includes, respectively, an internal switch or gateway device 330, 340, and 350. It is to be appreciated that the internal switch or gateway devices 330, 340, and 350 may be implemented, according to the example, as devices selected from one or more of the first, second or third sets of network devices 160, 170, and 180. In addition, each subsystem or network domain 302, 304, 306, and 308 within the associated vehicle 10 can contain any combination of devices selected from the first, second or third sets of network devices 160, 170, and 180.

In the example embodiment shown in FIG. 3, the second sub-network 304 is a CAN, LIN, or other network and includes a first ECU 332 having communication and processing capabilities of the third set of network devices 180, a second ECU 334 having communication and processing capabilities of the first set of network devices 160, and a third ECU 336 having communication and processing capabilities of the first set of network devices 160. Similarly, the third sub-network 306 is a CAN, LIN, or other network and includes a first ECU 342 having communication and processing capabilities of the first set of network devices 160, a second ECU 344 having communication and processing capabilities of the second set of network devices 170, and a third ECU 346 having communication and processing capabilities of the second set of network devices 170. Lastly in the example embodiment shown in FIG. 3, the fourth sub-network 308 is an Ethernet network and includes a first ECU 352 having communication and processing capabilities of the third set of network devices 180, a second ECU 354 having communication and processing capabilities of the first set of network devices 160, and a third ECU 356 having communication and processing capabilities of the second set of network devices 170.

In accordance with the embodiments herein, with regard to security key management, the collection of session keys used to protect data to be communicated from a Type-X device to a Type-Y device will be referred to as "X-to-Y session keys" or "X-to-Y keys." The X-to-Y keys may be allowed to be different from the Y-to-X keys. For example, larger keys can be used between devices among the third set of network devices 180 (Type-A) than between devices among the first set of network devices 160 (Type-B). In an embodiment, the B-to-A session keys for some Type-B devices can be larger than for other Type-B devices to allow messages from selected Type-B devices to have a higher level of protection than messages from other Type-B devices.

In the example embodiment illustrated, each device is pre-configured with a set of permanent keys used to bootstrap its security operations. These permanent keys can be, for example, a set of public-private key pairs and their certificates for the third set (Type-A) of network devices 180, and a set of private Master Private Keys for any other type of device. Each device may also be provisioned in an embodiment with an Authentication Token wherein, in the example embodiment the Authentication Token is an encrypted data object that the device can use to authenticate itself with the Onboard Authentication Proxy Logic 130.

Multiple in-vehicle devices can form a communication group and use a common set of Group Keys to generate their session keys for securing communications within the group. A Group Key of a device among the third set of network devices 180 (Type-A) contains keys for generating A-to-A keys, A-to-B, B-to-A, and C-to-A keys. A Group Key of a device among the first set of network devices 160 (Type-B) contains keys for generating B-to-A, A-to-B, and B-to-B keys. Lastly, a device among the second set of network devices 170 (Type-C) contains keys for generating C-to-A and C-to-B session keys.

In accordance with the embodiments herein, the devices establish their respective Group Keys as a result of successful device authentication. Different types of devices can use different methods to establish the Group Keys depending on the device's capabilities. For example, devices among the third set of network devices 180 (Type-A) may use public-key based key establishment protocols. Devices among the first set of network devices 160 (Type-B) can use preconfigured private keys and symmetric-key encryption to establish Group Keys or they can be given the Group Keys by the Onboard Key Server portion 100 of the Connected Vehicle Gateway network device 310. Lastly, device among the second set of network devices 170 (Type-C) can be preconfigured with Group Keys.

In order for establishing secure communications, each device needs to know the session keys for each of its communication peers. In accordance with the example embodiments herein, rather than the requirement that each device first discover its communication peers and then perform a key agreement protocol with each peer to establish the session keys, which requires every device to implement a peer discovery protocol and execute key establishment protocol with each peer and can be impractical for many in-vehicle devices with highly constrained computing and communication capabilities, the need for explicit peer discovery protocol is eliminated and the requirement of devices performing key establishment with each individual communication peer is eliminated. Instead, in accordance with the example embodiments herein, each device establishes the Group Keys as a result of its authentication with the Onboard Key Server portion 100 of the Connected Vehicle Gateway network device 310 and uses the Group Keys to locally generate and update its session keys. The Onboard Key Server portion 100 of the Connected Vehicle Gateway network device 310 obtains the C-to-B session keys and the C-to-A session keys from one or more off-board authentication servers 190 and distributes them to devices of the third and first sets (Types A and B) of associated network devices 180, 160 that need to receive messages from the devices of the second set (Type-C) of associated network devices 170.

In accordance with the embodiments herein, authentication of in-vehicle devices having unequal capabilities such as for example having different communication and processing capabilities is enabled. In an example embodiment, a Connected Vehicle Gateway device 310 that acts as the Onboard Authentication Proxy logic 130 (FIG. 1) and includes onboard key server logic for authenticating other in-vehicle devices, and serves as the vehicle's interface with external networks. The original Connected Vehicle Gateway on a vehicle is authenticated by the device or vehicle manufacturer during device or vehicle manufacturing process. New Connected Vehicle Gateway device 310 installed on a vehicle can be either pre-authenticated or be authenticated by an off-board authentication server when it can access the off-board authentication server. As a result of successful authentication, the Connected Vehicle Gateway device 310 acquires all the necessary security materials it will need to communicate with other in-vehicle devices and to provide the Onboard Authentication Proxy and the Onboard Key Server functions.

In accordance with the embodiments herein, devices belonging to the third set of network devices 180 (Type-A) are authenticated by the Onboard Authentication Proxy on the Connected Vehicle Gateway device 310. Since the devices belonging to the third set of network devices 180 (Type-A) are powerful devices, they may use any standard authentication protocols and algorithms to authenticate with the Connected Vehicle Gateway device 310 as necessary or desired.

Figure 4:
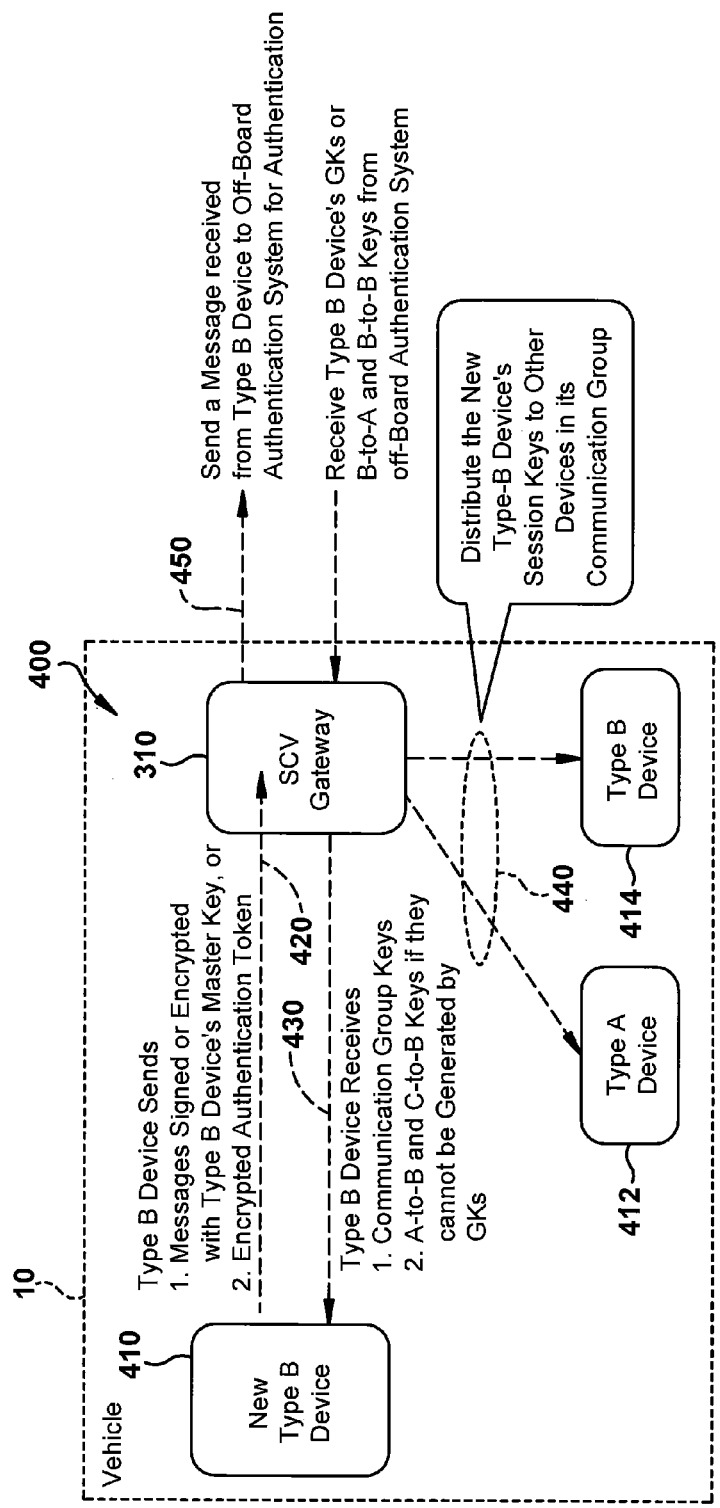

FIG. 4 is a control flow diagram illustrating a sample procedure 400 for authenticating a device 410 selected from the first set of network devices 160 (Type-B). In accordance with the example embodiment, overall, devices selected from the first set of network devices 160 (Type-B) are authenticated by the Connected Vehicle Gateway device 310 based on symmetric keys. In the illustrated embodiment, the authentication can be achieved in accordance with a first procedure or a second procedure, both to be described and shown with reference to FIG. 4.

In accordance with the first authentication procedure and with continued reference to FIG. 4, the device 410 selected from the first set of network devices 160 (Type-B) selectively sends at 420 an encrypted version of its Authentication Token to the Connected Vehicle Gateway device 310. The Connected Vehicle Gateway device 310 uses the Authentication Token to directly and locally authenticate the device 410. Upon successful authentication, the new device 410 (Type-B) and the Connected Vehicle Gateway device 310 both selectively generate at 430 the keying materials that the new Type-B device will need to communicate with other in-vehicle devices. The Connected Vehicle Gateway device 310 then distributes these keys at 440 to other devices 412, 414 that are authorized to receive data from the new Type-B device 410.

In accordance with the second authentication procedure and with continued reference to FIG. 4, the new device 410 selected from the first set of network devices 160 (Type-B) selectively sends at 450 signed or encrypted data packets to an off-board authentication processor 190 (FIG. 1) via an associated authentication network 142. In this case, the Connected Vehicle Gateway device 310 authenticates the device 410 (Type-B) by verifying or decrypting these packets. Successful verification of the signatures or decryption of the encrypted messages indicates that the device 410 (Type-B) is authenticated.

With continued reference to FIG. 4 and in accordance with the embodiment illustrated there, in either of the above first and second authentication protocol cases, if the Connected Vehicle Gateway device 310 cannot verify or decrypt the messages received from the new Type-B device 410, the Connected Vehicle Gateway device 310 is operative to forward one or a small set of these messages to the off-board authentication system including the off-board authentication processor 190 and associated authentication network 142 (FIG. 1) for example, which will try to authenticate the new Type-B device 410 by verifying or decrypting the messages. Upon successful authentication, the off-board authentication system 190 is operative to send the new Group Keys of the Type-B device 410 (or the device's B-to-A and B-to-B session keys) to the Connected Vehicle Gateway device 310. The Connected Vehicle Gateway device 310 then distributes at 440 these session keys to the newly authenticated Type-B device 410 and other devices 412, 414 that need to receive data from the new Type-B device 410. If the Connected Vehicle Gateway device 310 within the associated vehicle 10 cannot access the off-board authentication system 190 temporarily, the traffic from the new Type-B device 410 is selectively accepted by the Connected Vehicle Gateway device 310 for a predefined time period to allow the new device 410 to function while authentication is in progress.

Figure 5:
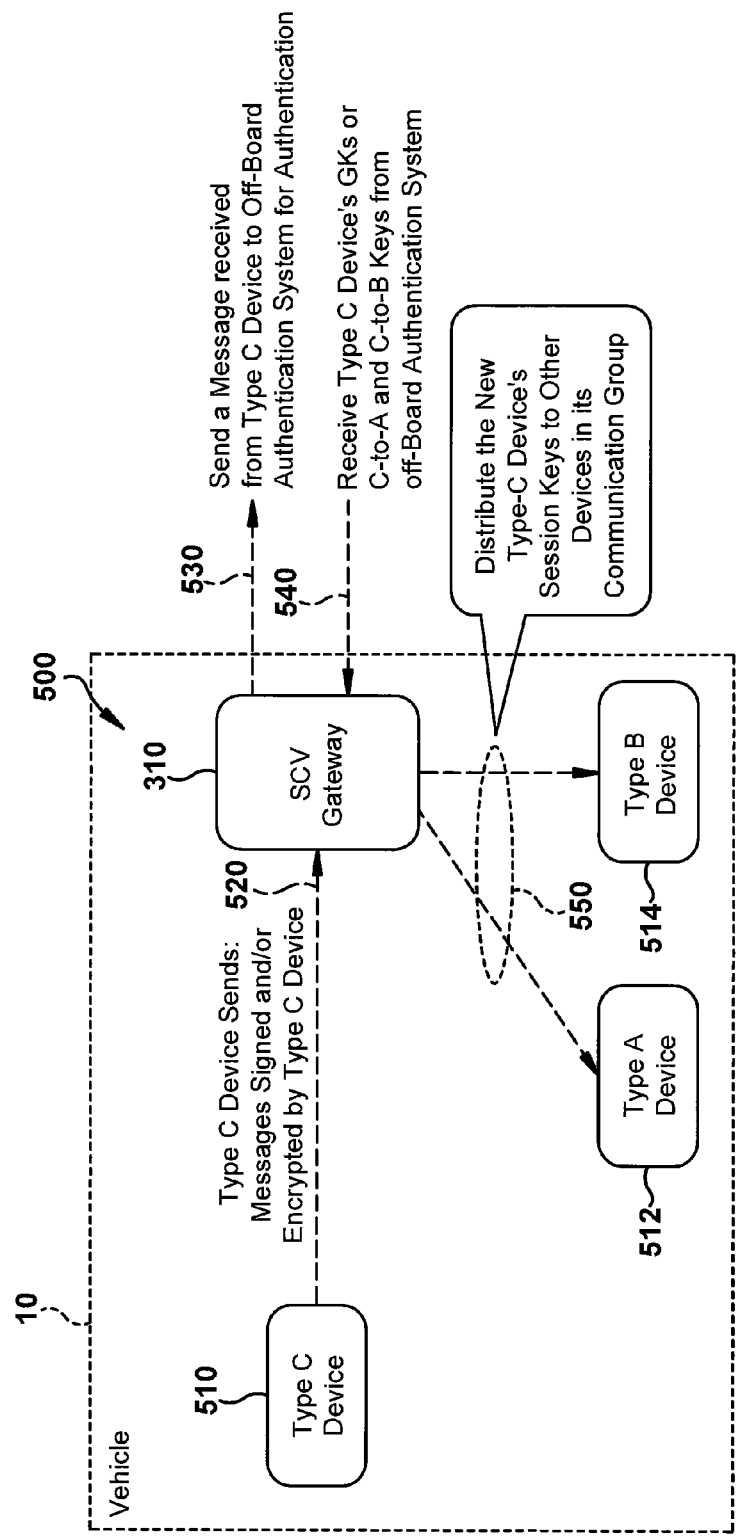
FIG. 5 is a flow diagram illustrating a sample procedure for authenticating a device ("Type-C" device) selected from the second set of in-vehicle network devices having capabilities as shown in FIG. 2b.

FIG. 5 is a control flow diagram illustrating a sample procedure 500 for authenticating a device 510 selected from the second set of network devices 170 (Type-C). In accordance with the example embodiment, overall, devices selected from the second set of network devices 170 (Type-C) do not run or otherwise perform any authentication protocol. In general, devices selected from the second set of network devices 170 (Type-C) start sending signed or encrypted messages as soon as they wake, are energized, or otherwise boot up. In accordance with the embodiment, the Connected Vehicle Gateway device 310 captures these messages at 520 and authenticates the device 510 of the second set of network devices 170 (Type-C) by verifying or decrypting these messages. If the Connected Vehicle Gateway device 310 cannot verify or decrypt these messages, the Connected Vehicle Gateway device 310 forwards one or a small set of the messages at 530 to the off-board authentication system including the off-board authentication processor 190 and associated authentication network 142 for example (FIG. 1), which will try to verify or decrypt the messages. Upon successful verification or decryption, the off-board authentication system will send to the Connected Vehicle Gateway device 310 at 540 the Group Keys for generating the Type-C device's session keys (or the Type-C device's C-to-A session keys and C-to-B session keys). The Connected Vehicle Gateway device 310 distributes these keys at 550 to the other authenticated in-vehicle devices 512, 514 that need to receive messages from the newly authenticated Type-C device 510. If the Connected Vehicle Gateway device 310 within the associated vehicle 10 cannot access the off-board authentication system 190 temporarily, the traffic from the new Type-C device 510 is selectively accepted by the Connected Vehicle Gateway device 310 for a predefined time period to allow the new device 510 to function while authentication is in progress.

Figure 6:
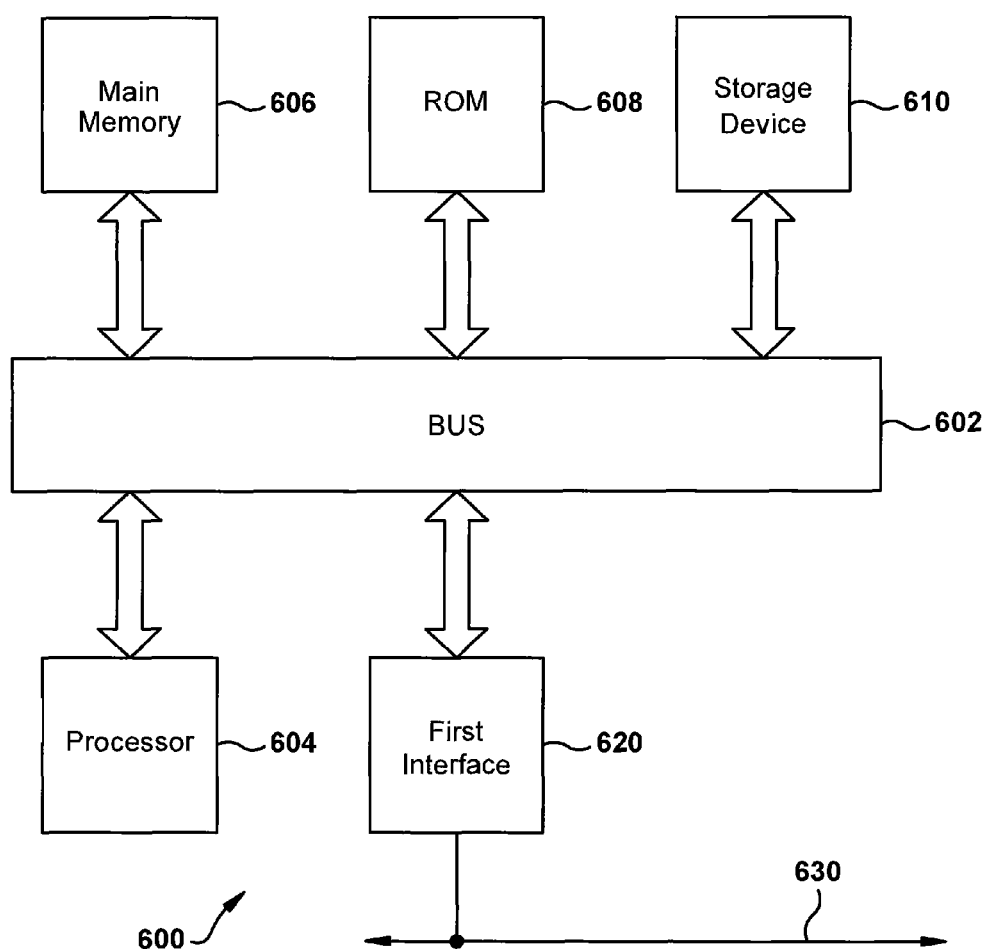
FIG. 6 is a block diagram illustrating an example of a computer system upon which an example embodiment can be implemented.

FIG. 6 is a block diagram illustrating an example of a computer system 600 upon which an example embodiment can be implemented. Computer system 600 may be employed to implement the functionality of the authentication proxy logic 130 in the apparatus 100 in general, as well as the Connected Vehicle Gateway device 310 of the one or more associated vehicles 10.

Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 304. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, optical disk, and/or flash storage, is provided and coupled to bus 602 for storing information and instructions.

An aspect of the example embodiment is related to the use of computer system 600 for authenticating devices having unequal capabilities. A further aspect of the example embodiment is related to the use of computer system 600 for authenticating devices having unequal capabilities such as for example in-vehicle electronic devices having varying different communication and processing capabilities. According to an example embodiment, these functionalities are provided by computer system 600 in response to the processor 604 executing one or more sequences of one or more instructions contained in a non-transitory main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any non-transitory medium that participates in providing instructions to processor 604 for execution. Such a medium may take many forms, including but not limited to non-volatile media, and volatile media. Non-volatile media include for example optical or magnetic disks, such as storage device 610. Volatile media includes dynamic memory such as main memory 606. As used herein, tangible media may include any non-transitory media such as a volatile and non-volatile media. Common forms of computer-readable media include for example floppy disk, a flexible disk, hard disk, magnetic cards, paper tape, any other physical medium with patterns of holes, a RAM, a PROM, an EPROM, a FLASH-PROM, CD, DVD or any other memory chip or cartridge, or any other medium from which a computer can read.

Various forms of computer-readable media may be involved in carrying one or more sequences of one or more instructions to processor 604 for execution. For example, the instructions may initially be borne on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606 from which processor 604 retrieves and executes the instructions. The instructions received by main memory 606 may optionally be stored on storage device 610 either before or after execution by processor 604.

Computer system 600 also includes a first communication interface 620 operatively coupled with the bus 602. Communication interface 620 provides a two-way data communication coupling computer system 600 with a communication link 630. For example, communication interface 620 may be a local area network (LAN) card to provide a data communication connection to a compatible LAN such as for example a Controller Area Network (CAN) network. As another example, communication interface 620 may be an integrated services digital network (ISDN) card or a modem to provide a data communication connection to a corresponding type of telephone line. Wireless links may also be implemented. In any such implementation, communication interface 620 sends and receives electrical, electromagnetic, or optical signals that carry digital data streams representing various types of information.

In view of the foregoing structural and functional features described above, a methodology in accordance with an example embodiment will be better appreciated with reference to FIGS. 7, 8a, 8b, 9a, and 9b. While, for purposes of simplicity of explanation, the methodologies of these FIGS. are shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect the example embodiment. The methodologies described herein are suitably adapted to be implemented in hardware, software, or a combination thereof.

Figure 7:
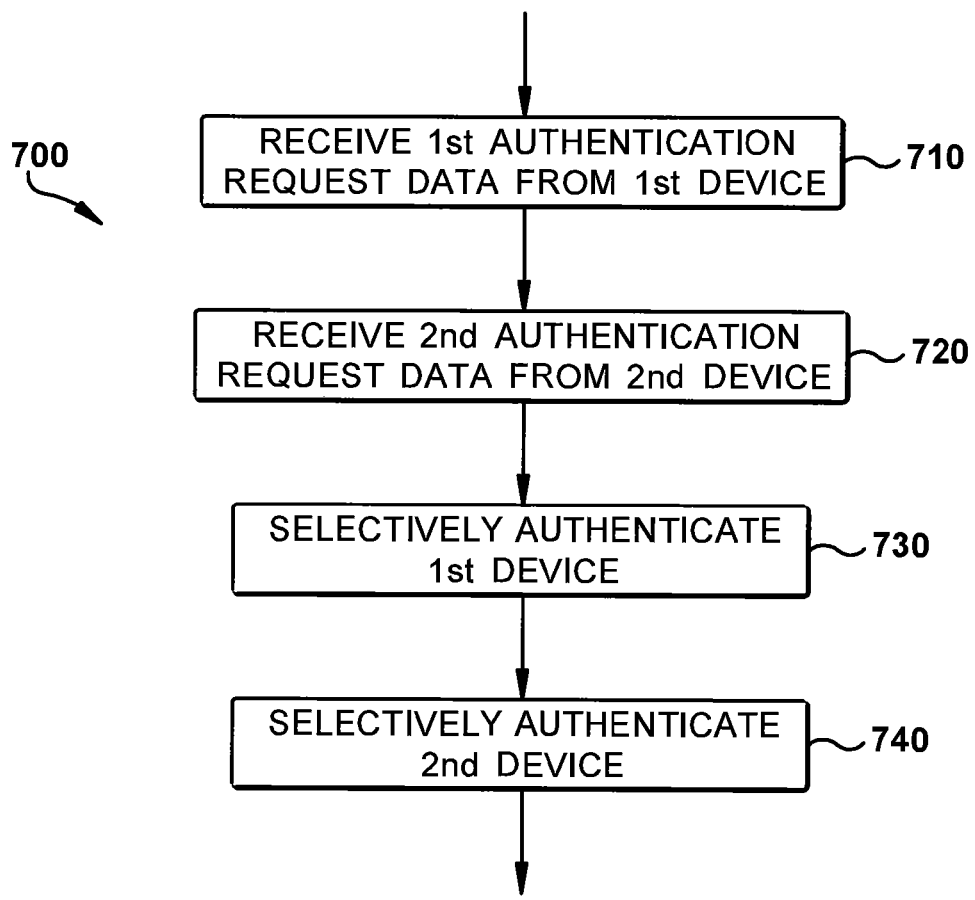
FIG. 7 is a flow chart showing a method in accordance with an example embodiment of authenticating a plurality of associated network devices having unequal communication capabilities.

With reference first to FIG. 7, a method 700 in accordance with an example embodiment of authenticating a plurality of associated network devices having unequal communication capabilities will be described. A first signal 162 (FIG. 1) is received at 710 by the first communication port 110. The first communication port 110 is configured to communicate via the associated communication network 140 with first and second sets of associated network devices 160, 170 having the first and second authentication capabilities respectively. The first signal 162 received comprises first authentication request data 164 representative of a request for authentication from at least one 166 of the first set of associated network devices 160 having the first authentication capability. A second signal 172 is received at 720 by the first communication port 110 wherein the second signal 172 comprises second authentication request data 174 representative of a request for authentication from at least one 176 of the second set of associated network devices 170 having the second authentication capability. At 730 the authentication proxy processor 130 selectively authenticates the at least one of the first set of associated network devices 166 based on the first authentication request data 164 in accordance with the first authentication capability. Similarly, at 740, the authentication proxy processor 130 selectively authenticates the at least one of the second set of associated network devices 176 based on the second authentication request data 174 in accordance with the second authentication capability.

Figure 8A:
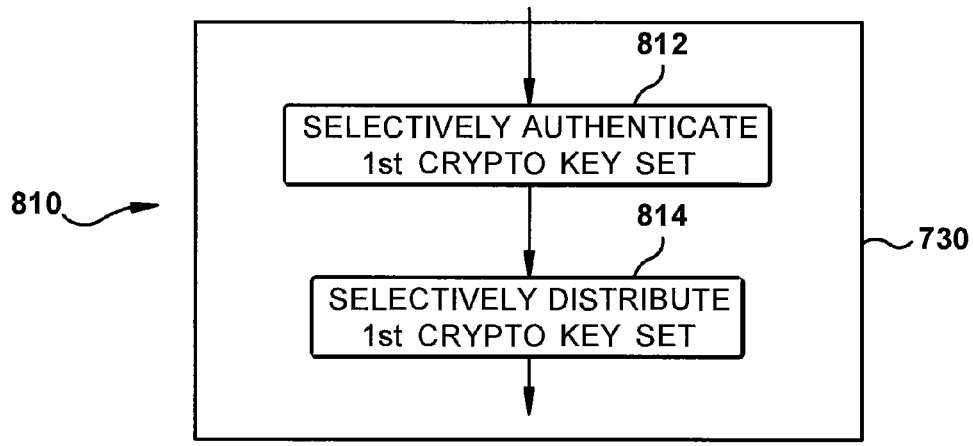
FIGS. 8a, 8b, and 8c are flow charts showing methods of authenticating a plurality of associated network devices having unequal communication capabilities by authentication proxy logic local to the network devices.

FIG. 8a shows the selective authentication of step 730 of FIG. 7 in greater detail. With reference now to that Figure, the authentication proxy logic 130 selectively generates at 812 a first cryptographic key set 168 responsive to the authentication proxy logic 130 authenticating the at least one of the first set of associated network devices 166 based on the first authentication request data 164 in accordance with the first authentication capability. At 814, the authentication proxy logic 130 selectively distributes the first cryptographic key set 168 to the first set of associated network devices 160.

Figure 8B:
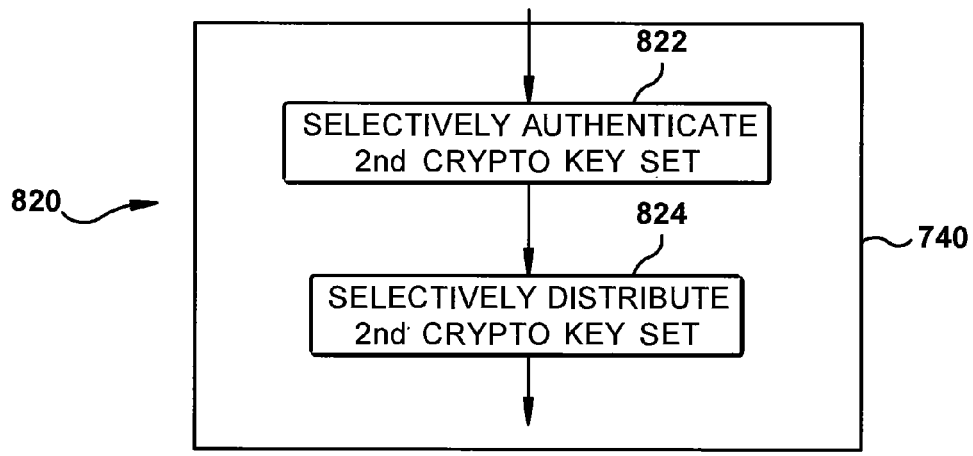

FIG. 8b shows the selective authentication of step 740 of FIG. 7 in greater detail. With reference now to that Figure, the authentication proxy logic 130 selectively generates at 822 a second cryptographic key set 178 responsive to the authentication proxy logic 130 authenticating the at least one of the second set of associated network devices 176 based on the second authentication request data 174 in accordance with the second authentication capability. At 814, the authentication proxy logic 130 selectively distributes the second cryptographic key set 178 to the first set of associated network devices 160. It is to be appreciated that in the example embodiment the second set of associated network devices 170 are limited in their capabilities, particularly their communication and processing capabilities to only send but not receive messages or other electronic communications from devices of the overall in-vehicle network.

Figure 8C:
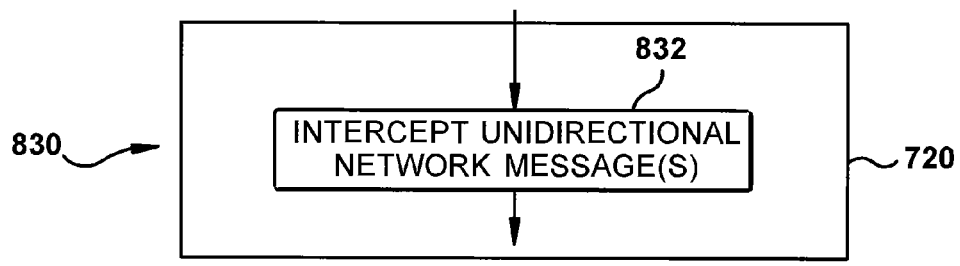

FIG. 8c shows the receiving the second authentication request data step 720 of FIG. 7 in greater detail. With reference now to that Figure, since the second set of associated network devices 170 are limited in their capabilities, particularly their communication and processing capabilities to only send but not receive messages or other electronic communications from devices of the overall in-vehicle network, the authentication proxy logic 130 is operative to intercept at 832 unidirectional message data transmitted by the at least one 176 of the second set of associated network devices 170 into the associated communication network 140.

Figure 9A:
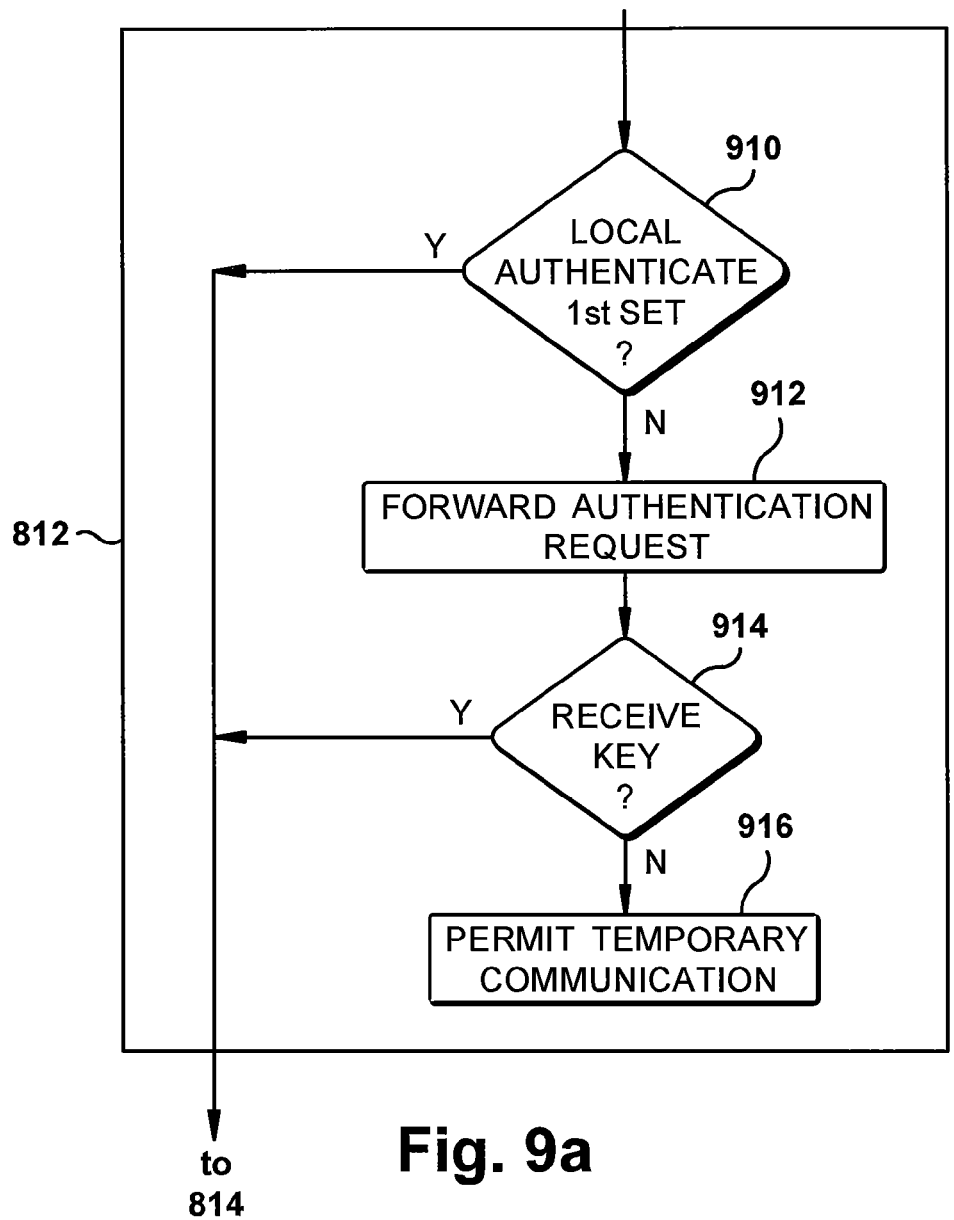
FIGS. 9a and 9b are flow charts showing methods of authenticating a plurality of associated network devices having unequal communication capabilities by authentication proxy logic in operative communication with an authentication processor remote to the network devices.

In FIG. 9a, shows authentication of a one of the first set of network devices by the authentication proxy logic 130 using the associated authentication processor 190 via the associated authentication network 142 in accordance with the example embodiment. Responsive to the authentication proxy logic 130 failing to locally authenticate the at least one 166 of the first set of associated network devices 160 at step 812 (FIG. 8a), at 910, the authentication proxy logic 130 selectively forwards at 912, by the second communication port 120 configured to communicate via the associated authentication network 142 with the associated authentication processor 190 the first authentication request data 164. At 914, the authentication proxy logic 130 selectively receives a first cryptographic key set 168 via the second communication port 120 from the associated authentication network 142 responsive to the associated authentication processor 190 authenticating the at least one 166 of the first set of associated network devices 160 based on the first authentication request data 164. At 814 (FIG. 8a), the authentication proxy logic 130 selectively distributes the first cryptographic key set 168 to the first set of associated network devices 160. At step 916, the authentication proxy logic 130 permits the newly added device of the first set of associated network devices 160 to operate or otherwise function for a predefined time period to allow the new device to perform initial limited integration functions while authentication is in progress.

Figure 9B:
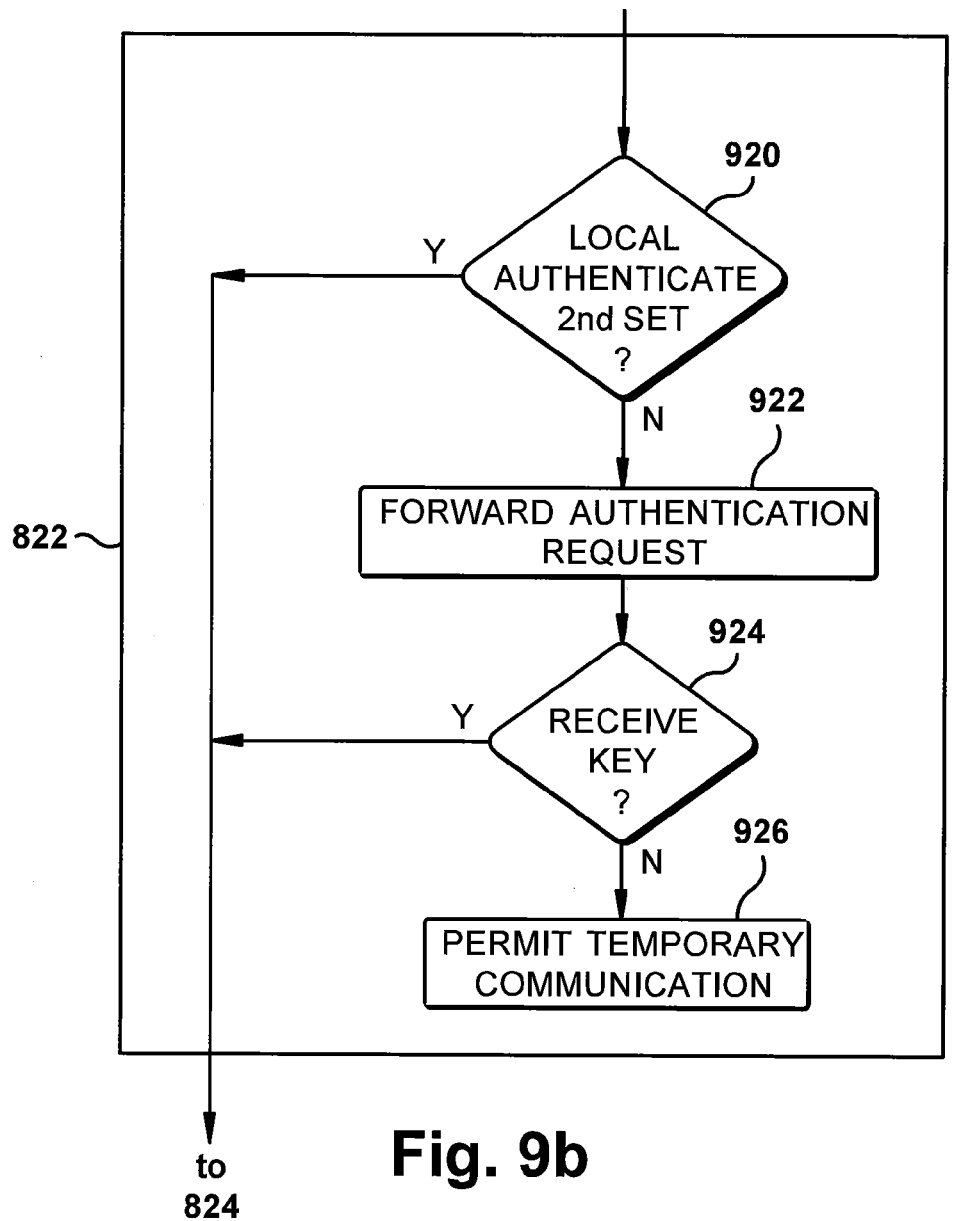

In FIG. 9b, shows authentication of a one of the second set of network devices by the authentication proxy logic 130 using the associated authentication processor 190 via the associated authentication network 142 in accordance with the example embodiment. Responsive to the authentication proxy logic 130 failing to locally authenticate the at least one 176 of the second set of associated network devices 170 at step 822 (FIG. 8b), at 920, the authentication proxy logic 130 selectively forwards at 922, by the second communication port 120 configured to communicate via the associated authentication network 142 with the associated authentication processor 190 the second authentication request data 174. At 924, the authentication proxy logic 130 selectively receives a second cryptographic key set 178 via the second communication port 120 from the associated authentication network 142 responsive to the associated authentication processor 190 authenticating the at least one 176 of the second set of associated network devices 170 based on the second authentication request data 174. At 824 (FIG. 8b), the authentication proxy logic 130 selectively distributes the second cryptographic key set 178 to the first set of associated network devices 170. It is to be appreciated that in the example embodiment the second set of associated network devices 17 are limited in their capabilities, particularly their communication and processing capabilities to only send but not receive messages or other electronic communications from devices of the overall in-vehicle network. At step 926, the authentication proxy logic 130 permits the newly added device of the second set of associated network devices 170 to operate or otherwise function for a predefined time period to allow the new device to perform initial limited integration functions while authentication is in progress.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus for authentication of in-vehicle network devices comprising:
   a first communication port configured to receive via an associated communication network a first authentication request from at least one network device of a first set of associated network devices having a first authentication capability, and a second authentication request from at least one network device of a second set of associated network devices having a second authentication capability different than the first authentication capability, wherein the second authentication request is unidirectional message data; and
   a connected vehicle gateway portion of a selected in-vehicle device implemented as an onboard authentication proxy logic operatively coupled with the first communication port;
   wherein the authentication proxy logic is configured to:
      selectively authenticate at least one of the first set of associated network devices based on the first authentication request in accordance with the first authentication capability, wherein selectively authenticating the at least one of the first set of associated network devices comprises selectively generating a first cryptographic key set;
      selectively authenticate at least one of the second set of associated network devices based on the second authentication request in accordance with the second authentication capability, wherein selectively authenticating the at least one of the second set of associated network devices comprises selectively generating a second cryptographic key set; and
      distribute the first and second cryptographic key sets to the first set of associated network devices, without distributing the first and second cryptographic key sets to the second set of associated network devices.

2. The apparatus according to claim 1, further comprising:
   a second communication port operatively coupled with the authentication proxy logic, the second communication port being configured to communicate via an associated authentication network with an associated authentication processor;

wherein the authentication proxy logic selectively forwards the first authentication request data to the associated authentication processor by the second communication port via the associated authentication network responsive to the authentication proxy logic failing to locally authenticate the at least one of the first set of associated network devices based on the first authentication request data in accordance with the first authentication capability.

3. The apparatus according to claim 2, wherein:
the authentication proxy logic selectively receives a first cryptographic key set by the second communication port via the associated authentication network responsive to the associated authentication processor authenticating the at least one of the first set of associated network devices based on the first authentication request data; and
the authentication proxy logic selectively distributes the first cryptographic key set to the first set of associated network devices.

4. The apparatus according to claim 3, wherein:
the authentication proxy logic selectively forwards the second authentication request data to the associated authentication processor by the second communication port via the associated authentication network responsive to the authentication proxy logic failing to locally authenticate the at least one of the second set of associated network devices based on the second authentication request data in accordance with the second authentication capability;
the authentication proxy logic selectively receives a second cryptographic key set by the second communication port via the associated authentication network responsive to the associated authentication processor authenticating the at least one of the second set of associated network devices; and
the authentication proxy logic selectively distributes the second cryptographic key set to the first set of associated network devices.

5. A method for authentication of in-vehicle network devices comprising:
receiving a first signal by a first communication port configured to communicate via an associated communication network with first and second sets of associated network devices having first and second authentication capabilities respectively, the first signal comprising a first authentication request from at least one of the first set of associated network devices having the first authentication capability;
receiving a second signal by the first communication port, the second signal comprising a second authentication request from at least one of the second set of associated network devices having the second authentication capability, wherein the second authentication request is unidirectional message data;
selectively authenticating by a connected vehicle gateway portion of a selected in-vehicle device implemented as an onboard authentication proxy processor the at least one of the first set of associated network devices based on the first authentication request data in accordance with the first authentication capability, wherein selectively authenticating the at least one of the first set of associated network devices comprises selectively generating a first cryptographic key set;
selectively authenticating by the authentication proxy processor the at least one of the second set of associated network devices based on the second authentication request data in accordance with the second authentication capability, wherein selectively authenticating the at least one of the second set of associated network devices comprises selectively generating a second cryptographic key set; and
distributing the first and second cryptographic key sets to the first set of associated network devices, without distributing the first and second cryptographic key sets to the second set of associated network devices.

6. The method according to claim 5, further comprising:
selectively forwarding by a second communication port configured to communicate via an associated authentication network with an associated authentication processor the first authentication request data responsive to the authentication proxy logic failing to locally authenticate the at least one of the first set of associated network devices based on the first authentication request data in accordance with the first authentication capability.

7. The method according to claim 6, further comprising:
selectively receiving by the authentication proxy logic a first cryptographic key set via the second communication port from the associated authentication network responsive to the associated authentication processor authenticating the at least one of the first set of associated network devices based on the first authentication request data; and
selectively distributing by the authentication proxy logic the first cryptographic key set to the first set of associated network devices.

8. The method according to claim 7, further comprising:
selectively forwarding by the second communication port configured to communicate via an associated authentication network with the associated authentication processor the second authentication request data responsive to the authentication proxy logic failing to locally authenticate the at least one of the second set of associated network devices based on the second authentication request data in accordance with the second authentication capability;
selectively receiving by the authentication proxy logic a second cryptographic key set by the second communication port via the associated authentication network responsive to the associated authentication processor authenticating the at least one of the second set of associated network devices; and
selectively distributing by the authentication proxy logic the second cryptographic key set to the first set of associated network devices.

9. Logic for authentication of in-vehicle network devices, the logic being encoded in one or more tangible non-transient computer readable media for execution by an associated processor onboard a vehicle and when executed by the associated processor the logic being operable to:
receive a first signal by a first communication port configured to communicate via an associated communication network with first and second sets of associated network devices having first and second authentication capabilities respectively, the first signal comprising first authentication request data representative of a request for authentication from at least one of the first set of associated network devices having the first authentication capability;
receive a second signal by the first communication port, the second signal comprising second authentication request data representative of a request for authentication from at least one of the second set of associated network devices having the second authentication capability;

selectively forward by a second communication port configured to communicate via an associated authentication network with an associated authentication processor the first authentication request data responsive to a connected vehicle gateway portion of a selected in-vehicle device implemented as an onboard authentication proxy logic failing to locally authenticate the at least one of the first set of associated network devices based on the first authentication request data in accordance with the first authentication capability;

selectively receive by the authentication proxy logic a first cryptographic key set via the second communication port from the associated authentication network responsive to the associated authentication processor authenticating the at least one of the first set of associated network devices based on the first authentication request data;

selectively forward by the second communication port configured to communicate via an associated authentication network with the associated authentication processor the second authentication request data responsive to the authentication proxy logic failing to locally authenticate the at least one of the second set of associated network devices based on the second authentication request data in accordance with the second authentication capability;

selectively receive by the authentication proxy logic a second cryptographic key set by the second communication port via the associated authentication network responsive to the associated authentication processor authenticating the at least one of the second set of associated network devices; and selectively distribute by the authentication proxy logic the first and second cryptographic key sets to the first set of associated network devices.

10. The logic according to claim 9, being further operable to:
  selectively generate by the authentication proxy logic a first cryptographic key set responsive to the authentication proxy logic authenticating the at least one of the first set of associated network devices based on the first authentication request data in accordance with the first authentication capability; and
  selectively distribute by authentication proxy logic the first cryptographic key set to the first set of associated network devices.

11. The logic according to claim 10, being further operable to:
  selectively generate by the authentication proxy logic a second cryptographic key set responsive to the authentication proxy logic authenticating the at least one of the second set of associated network devices based on the second authentication request data in accordance with the second authentication capability; and
  selectively distribute by authentication proxy logic the second cryptographic key set to the first set of associated network devices.

12. The logic according to claim 11, wherein:
  the receiving the second authentication request data representative of a request for authentication from at least one of the second set of associated network devices comprises intercepting by the authentication proxy logic unidirectional message data transmitted by the at least one of the second set of associated network devices into the associated communication network; and
  the distributing the first and second cryptographic key sets to the first set of associated network devices comprises foregoing distributing the first and second cryptographic key sets to the second set of associated network devices.

* * * * *